No. 751,753. PATENTED FEB. 9, 1904.
N. B. POWTER, DEC'D.
E. H. FALLOWS, EXECUTOR.
METHOD OF MAKING PHOSPHORIC ACID.
APPLICATION FILED OCT. 6, 1897. RENEWED JULY 14, 1903.
NO MODEL.
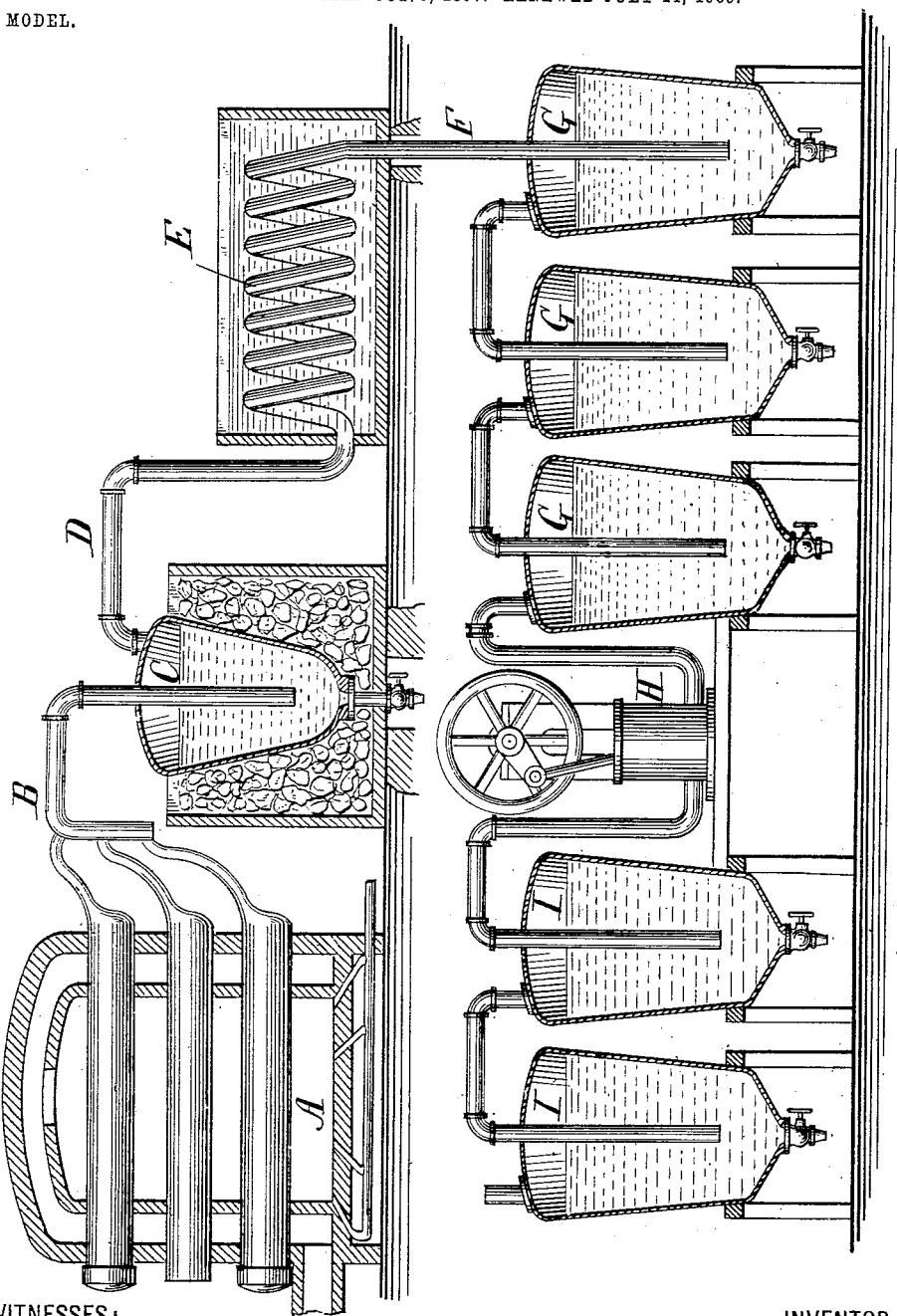
WITNESSES:
INVENTOR
BY
ATTORNEYS No. 751,753. Patented February 9, 1904.

UNITED STATES PATENT OFFICE.

NATHANIEL B. POWTER, OF BROOKLYN, NEW YORK; EDWARD H. FALLOWS EXECUTOR OF SAID POWTER, DECEASED.

METHOD OF MAKING PHOSPHORIC ACID.

SPECIFICATION forming part of Letters Patent No. 751,753, dated February 9, 1904.

Application filed October 6, 1897. Renewed July 14, 1903. Serial No. 165,524. (No specimens.)

*To all whom it may concern:*

Be it known that I, NATHANIEL B. POWTER, a subject of the Queen of Great Britain, residing at Brooklyn, in the county of Kings and State of New York, have invented a new and useful Process of Producing Phosphoric Acid; and I do hereby declare the following to be a full, clear, and exact description of the invention, such as will enable others skilled in the art to which it appertains to make and use the same.

My invention relates to the manufacture of phosphoric acid; and it consists in a process of producing phosphoric acid directly from aluminic and other phosphates, either pure or as found in nature as phosphate rock.

The objects of my invention are to produce phosphoric acid directly from aluminic and similar phosphates and by a process which is easily carried out, inexpensive, and economical. These objects are attained in the process herein described, an apparatus for the carrying out of which is diagrammatically illustrated in the drawing.

In carrying out my process I place the aluminic phosphate or other substance from which the phosphoric acid is to be obtained in a retort or series of retorts, connect the same to suitable collecting apparatus and to a suction-pump, and heat the retort to the required extent. Such extent will depend entirely upon the material being treated. With some material I have found that fumes will be evolved at a temperature of between 160° and 200° Fahrenheit, while other materials require a greater temperature, ranging all the way from 200° to 1,200° Fahrenheit. In practice I continue to heat the retort until the fumes are evolved. During the heating phosphoric acid is given off as a heavy sluggish gas, vapor, or fume, which can be withdrawn from the retort and collected only by applying suction to the retort. The phosphoric acid may be collected by passing it into suitable vessels, in which it is brought into contact with water, the gas being first cooled by preference. The gas begins to come off at a comparatively low heat, and the rapidity with which it comes off is largely dependent upon the amount of suction used. I have found that the application of practically any suction at all will be sufficient to carry off the fumes evolved and in practice so far have applied a suction equal to from one-quarter of an inch to two inches of a mercury column. It will be understood, however, that I do not desire to be limited to any degree of suction, as I may use different degrees thereof to any extent as I may desire, the essence of this invention being broadly the application of heat and suction to a material of the character described.

In the drawing I have illustrated an apparatus which may be used for carrying out the process.

A is a furnace containing a series of retorts connected to a pipe or pipes B, leading to a water-chamber C, which in construction is similar to the percolators or absorption-chambers subsequently employed for collecting the gas, but which is principally intended for catching such solid and other impurities as may be drawn over with the gas. It may be surrounded with ice, or other means may be provided for keeping it cool. From the chamber C a pipe D leads to a series of cooling-coils E and from thence the gas passes through a pipe F to a series of absorption-chambers G, in which the gas is caused to pass through a body of water, such gas as is not dissolved in one absorber passing over into the next. From the last absorber the gas passes into a combined suction and force pump H, arranged to draw the gases over from the retorts and to force such gases as have not been absorbed in the absorbers G into one or more absorbers I, containing a solution of potash or soda, which absorbs any phosphoric-acid gas which has not been absorbed in the first series of absorbers. Any gas which is not absorbed passes off through an escape-pipe.

The retorts may be constructed of clay or of any other suitable material not acted upon by the phosphoric acid and able to withstand the heat. Preferably the retorts are constructed with an opening which may be closed, hthroug which a rake may be inserted to stir up the charge in the retort from time to time.

Having thus completely described my invention, what I claim, and desire to secure by Letters Patent, is—

1. The herein-described process of producing phosphoric acid, which consists in heating phosphate rock within a suitable retort, applying suction to the retort, and collecting the gas evolved, substantially as described.

2. The herein-described process of producing phosphoric acid, which consists in heating aluminic or similar phosphates within a suitable retort, drawing off the fumes thereby produced, by suction, and collecting the same, substantially as described.

3. The herein-described process of producing phosphoric acid from phosphate rock, aluminic and similar phosphates, and collecting the same, which consists in heating within a suitable retort such a substance, drawing off the fumes thereby produced, by suction, cooling the same, and passing the fumes into water so as to cause them to dissolve therein, substantially as described.

In testimony whereof I affix my signature in presence of two witnesses.

NATHANIEL B. POWTER.

Witnesses:
BURNHAM KALISCH,
HARRY M. MARBLE.